US00RE41183E

(19) United States
(12) Reissued Patent
Najafi et al.

(10) Patent Number: US RE41,183 E
(45) Date of Reissued Patent: Mar. 30, 2010

(54) SYSTEM AND METHOD FOR WLAN SIGNAL STRENGTH DETERMINATION

(76) Inventors: Hamid Najafi, 26645 Altamont Rd., Los Altos Hills, CA (US) 94022; Xiping Wang, 1055 Escalon Ave., Apt. 709, Sunnyvale, CA (US) 94085-4161

(21) Appl. No.: 12/053,914

(22) Filed: Mar. 24, 2008

(Under 37 CFR 1.47)

Related U.S. Patent Documents

Reissue of:
(64) Patent No.: 7,020,442
Issued: Mar. 28, 2006
Appl. No.: 10/263,581
Filed: Oct. 2, 2002

(51) Int. Cl.
*H04B 17/00* (2006.01)

(52) U.S. Cl. ..... 455/67.11; 455/41.2; 455/234.1; 455/67.13; 455/63.1; 455/127.1; 455/263; 455/264; 370/332; 370/338; 370/447; 370/329

(58) Field of Classification Search ..... 455/67.11, 455/63.1, 67.13, 234.1, 414.1, 41.2, 127.1, 455/264; 709/223; 370/447
See application file for complete search history.

(56) References Cited

U.S. PATENT DOCUMENTS 4,031,469 A * 6/1977 Johnson ..... 455/226.4
5,303,395 A * 4/1994 Dayani ..... 455/571
5,533,010 A * 7/1996 Tanaka ..... 455/464
5,742,671 A * 4/1998 Parkerson et al.
6,208,148 B1 * 3/2001 Yuen
6,229,997 B1 * 5/2001 Addy
6,311,049 B1 * 10/2001 Yoshizawa ..... 455/250.1
6,377,608 B1 * 4/2002 Zyren
6,434,187 B1 * 8/2002 Beard et al. ..... 375/219
6,477,156 B1 * 11/2002 Ala-Laurila et al.
6,505,045 B1 * 1/2003 Hills et al.
6,732,163 B1 * 5/2004 Halasz
6,760,318 B1 * 7/2004 Bims
6,799,054 B2 * 9/2004 Shpak
6,842,605 B1 * 1/2005 Lappetelainen et al.
6,944,286 B1 * 9/2005 Nossing ..... 379/387.01
7,003,315 B2 * 2/2006 Kiyomoto et al. ..... 455/552.1
7,020,442 B2 * 3/2006 Najafi et al. ..... 455/67.11
7,324,478 B2 * 1/2008 Park et al. ..... 370/331
7,336,634 B2 * 2/2008 del Prado et al. ..... 370/332
7,355,994 B2 * 4/2008 Shpak ..... 370/320

* cited by examiner

*Primary Examiner*—Marceau Milord

(57) ABSTRACT

A method for WLAN signal strength determination comprises receiving a WLAN RF signal; converting the WLAN RF signal to a voltage proportional to the signal; comparing the voltage to a first reference voltage; and outputting data corresponding to WLAN RF signal strength if the voltage is greater than the first reference voltage.

29 Claims, 4 Drawing Sheets

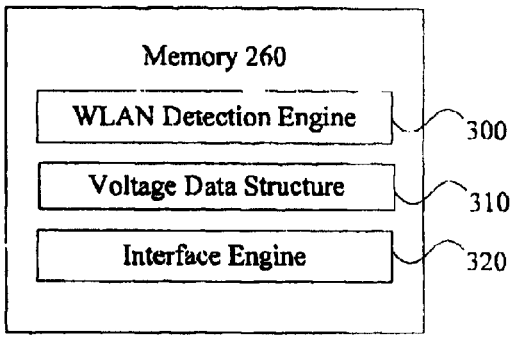
FIG. 3
| Voltage Data Structure 310 | |
|---|---|
| .7 V | Weak |
| .9 V | Medium |
| 1.1 V | Strong |
FIG. 4
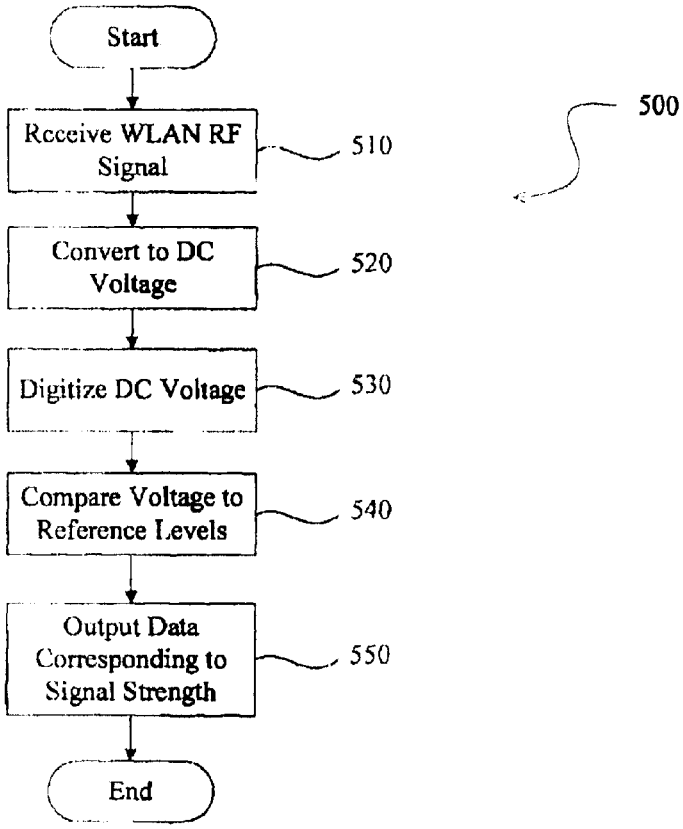
FIG. 5

| Power Level | Frequency | | |
|---|---|---|---|
| | 2400GHz | 2450GHz | 2500GHz |
| -65dBm | 1 LED on | 1 LED on | No LED on |
| -63dBm | 1 LED on | 1 LED on | 1 LED on |
| -55 dBm | 2 LED on | 2 LED on | 1 LED on |
| -54dBm | 2 LED on | 2 LED on | 2 LED on |
| -45dBm | 3 LED on | 2 LED on | 2 LED on |
| -44dBm | 3 LED on | 3 LED on | 3 LED on |
| -35dBm | 3 LED on | 3 LED on | 3 LED on |
| -30dBm | 3 LED on | 3 LED on | 3 LED on |
| -25dBm | 3 LED on | 3 LED on | 3 LED on |
| -20dBm | 3 LED on | 3 LED on | 3 LED on |

FIG. 7

SYSTEM AND METHOD FOR WLAN SIGNAL STRENGTH DETERMINATION

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a Reissue application of U.S. patent application Ser. No. 10/263,581, filed Oct. 2, 2002, now U.S. Pat. No. 7,020,442, granted Mar. 28, 2006.*

TECHNICAL FIELD

This invention relates generally to Wireless Local Area Networks (WLANs), and more particularly, but not exclusively, provides a system and method for determining the strength of a WLAN signal.

BACKGROUND

Wireless Local Area Networks (WLANs), such as Wi-Fi (IEEE 802.11b), are becoming prevalent throughout the United States and the world. The WLANs enable computer users to connect to a network, such as the Internet, without connecting a cable between their computer and a hard-wired access point. Therefore, by connecting to a WLAN, computer users can surf the web, access their email, access their corporate intranets via a virtual private network (VPN), etc. while on the go without having to carry cables with them and without having to look for and hook up to wired access points. Accordingly, WLANs are becoming very popular in many public areas that portable computer users frequent including cafes, hotel lobbies, and airport terminals.

To connect to a WLAN, a computer user must turn on his or her computer, wait for the operating system to load, and then try to connect to the WLAN. This process can take up to ten minutes, or longer in some cases, and may not lead to WLAN access since not all locations feature WLAN access and those featuring WLAN access may not have adequate coverage in all areas, including where a computer user may be trying to connect. Therefore, an attempt to access a WLAN may require multiple tries, take up an exorbitant amount of time, and still not lead to WLAN access.

For example, a computer user may try to connect to a WLAN in a corner of a library. However, that location in the library may not feature adequate coverage to support WLAN access. Therefore, after spending ten minutes attempting to access the WLAN, the computer user will discover that that location of the library does not support WLAN access and will have to try a different location in the library with no guarantee of success.

Therefore, a new system and method is needed for determining WLAN signal strength.

SUMMARY

The present invention provides a system for determining WLAN signal strength, such as Wi-Fi signal strength. The system comprises an antenna capable to receive an WLAN radio frequency (RF) signal, a power detector communicatively coupled to the antenna and capable of converting the RF signal into a DC voltage representing the RMS level of the signal; at least one comparator communicatively coupled to the detector to compare the DC voltage to a reference voltage; and an output interface communicatively coupled to the comparator to indicate WLAN signal strength. The system can be implemented in software, in circuitry or via other techniques. Further, the system can be integrated into a mobile phone, into a WLAN card, or as a standalone device.

The present invention further provides a method for determining WLAN strength. The method comprises receiving a WLAN RF signal; converting the received signal to a DC voltage; comparing the DC voltage to at least one reference voltage; and outputting the result of the comparison.

Accordingly, the system and method advantageously enables WLAN signal strength without having to boot up a computer, thereby saving a computer user time, effort, and battery power.

BRIEF DESCRIPTION OF THE DRAWINGS

Non-limiting and non-exhaustive embodiments of the present invention are described with reference to the following Figures, wherein like reference numerals refer to like parts throughout the various views unless otherwise specified.

FIG. 3 is a block diagram illustrating the memory of the mobile phone of FIGS. 2A and 2B;

FIG. 4 is a block diagram illustrating a voltage data structure of the memory of FIG. 3;

FIG. 5 is a flowchart illustrating a method of determining WLAN RF signal strength;

FIG. 7 is a table showing experimental data using the second embodiment of the invention.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
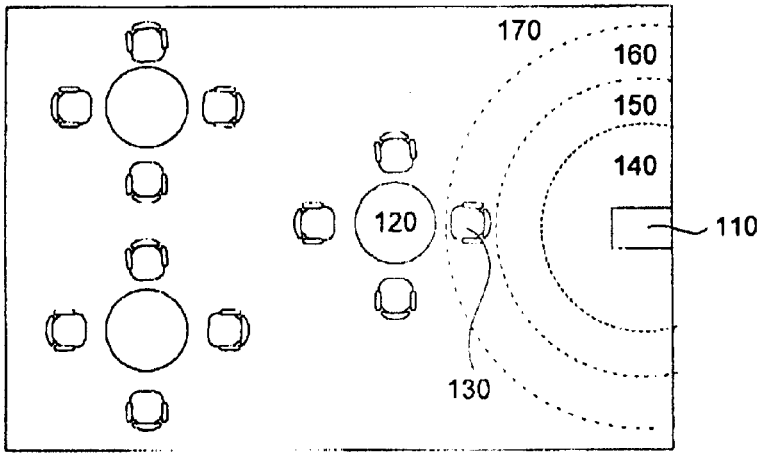
FIG. 1 is a diagram illustrating a conference room having a WLAN access point.

FIG. 1 is a diagram illustrating a conference room 100 having a WLAN access point 110. Conference room 100 includes three tables, such as table 120, and twelve chairs, such as chair 130, and a WLAN access point 110, which is located in the right of the room and communicates with a wireless card in a user's computer via RF signals. Examples of access points include Apple's Airport and 3COM's Airconnect wireless system. The range of the RF signal is generally a 50 to 150 meter radius from the WLAN access point 110, but can extend to up to a 300 meter radius in open areas. Connection speeds range from 1.6 Mbps with OpenAir technology to 11 Mbps with Wi-Fi. Signal strength decreases as a function of distance from the access point 110. For example, signal strength is strongest in zone 140. At zone 150, signal strength decreases, thereby enabling data transmission at a lower than the maximum rate. In zone 160, signal strength decreases further, enabling data transmission at a further reduced rate. Outside of zone 160, there is little or no signal strength and therefore data transmission may be possible at only the minimum rate or possibly not at all.

To access the WLAN via the access point 110, a user boots his/her computer and then logs in through a web page in their Internet web browser. Connection speed to the WLAN will vary based on distance from the access point 110 and possibly on interference from other devices. Conventionally, as a user may not know where the access point 110 is physically located, he or she may need to attempt to log on to the WLAN at different locations in conference room 100. For example, a user may first try to connect to the WLAN in zone 170, which is not feasible. The user may then move into zone 160, where a connection is feasible but the data communication rate may be relatively low. The user then must move around the room with his or her laptop on to find an area with a high data communication rate. If the user moves into zone 140, he or she will be able to connect to the WLAN at a relatively fast rate. Accordingly, in this example, a user might require several log in attempts to find a location offering WLAN access at an acceptable data communication rate.

Figure 2A:
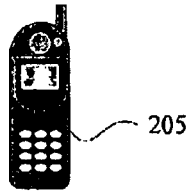
FIG. 2A is a diagram illustrating a mobile phone having a system to determine WLAN RF signal strength according to an embodiment of the invention.

FIG. 2A is a diagram illustrating a mobile phone 205 having a system to determine WLAN RF signal strength according to an embodiment of the invention. In an embodiment of the invention, the system in mobile phone 205 can determine Wi-Fi signal strength. Mobile phone 205 receives a WLAN RF signal, converts it a DC voltage, compares the DC voltage to at least one reference voltage, and outputs the results of the comparison on display 280. The results indicate signal strength and can be displayed in any format including a number corresponding to signal strength, colors corresponding to signal strength, text indicating signal strength and/or a bar corresponding to signal strength, etc. Alternatively, results can be output aurally.

Accordingly, a user can use the mobile phone 205 to determine WLAN strength before attempting to log on, to the WLAN via his or her computer. For example, a user can walk around conference room 100 with his or her mobile phone 205 and view display 280 to find the strongest signal strength. Upon finding the strongest signal strength in zone 140, the user can boot his or her computer and log in to the WLAN at the maximum data communication rate in zone 140.

Figure 2B:
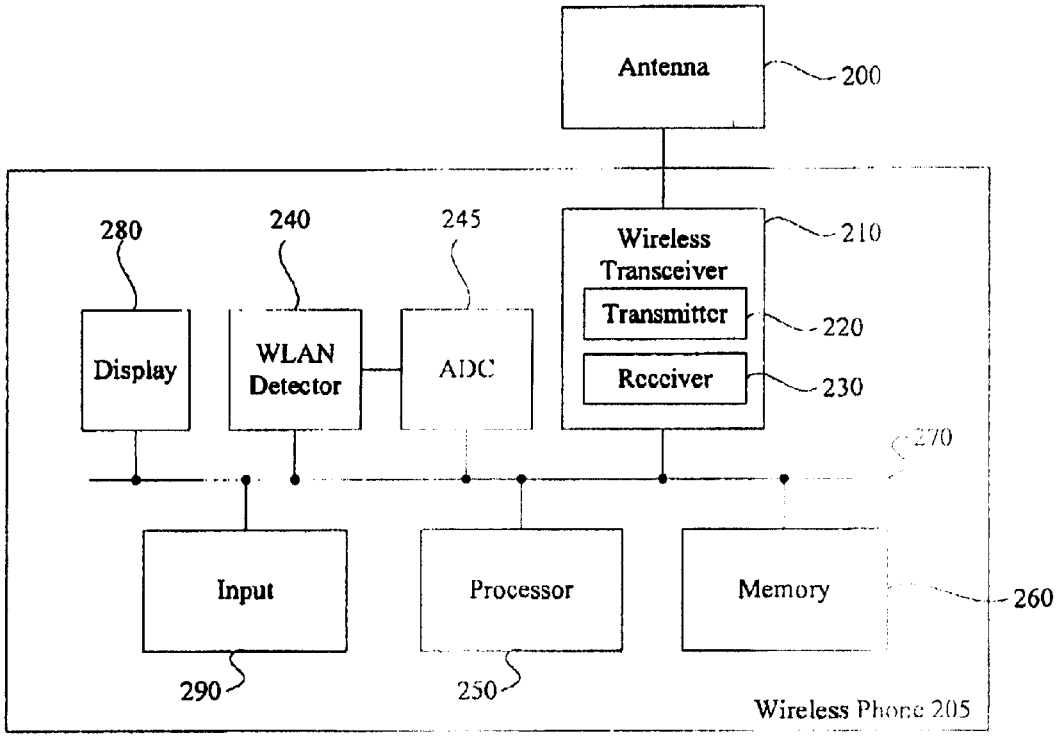
FIG. 2B is a block diagram illustrating the mobile phone of FIG. 2A.

FIG. 2B is a block diagram illustrating the mobile phone 205 (FIG. 2A). Phone 205 includes a wireless transceiver 210 capable to wirelessly communicate with wireless networks via cell sites; a memory device 260, such as such as a magnetic disk, Random Access Memory (RAM), Flash Memory or other memory device or combination thereof; a processor 250, such as an ARM 7 microprocessor or a Motorola 68000 microprocessor; a WLAN detector 240, such as an Analog Devices AD8361 or an Analog Devices AD8313; an Analog to Digital Converter (ADC) 245 communicatively coupled to WLAN detector 240; a display 280; and an input device 290, all interconnected for communication by a system bus 270. In addition, wireless transceiver 210 is communicatively coupled to antenna 200.

Transceiver 210 can wirelessly transmit and receive voice data via wireless networks such as GSM. The transceiver 210 comprises a transmitter 220 for transmitting voice data and a receiver 230 for receiving voice data.

WLAN detector 240 receives WLAN RF signals from access point 110 via antenna 200 and converts the WLAN RF signal into a DC voltage representing the RMS of the WLAN RF signal. ADC 245 then converts this DC voltage into a digital value for analysis by the processor 250 and engines stored in memory 260, as will be discussed further below.

Processor 250 executes engines stored in memory 260 to compare the digitized DC voltage that is output from the WLAN detector 240 via the ADC 245 to at least one reference voltage. In addition, the engines in memory 260 also output results of the comparison on display 280 to indicate WLAN signal strength. Memory 260 will be discussed in further detail in conjunction with FIG. 3 below.

Display 280 comprises a LCD display or other device for displaying data and displays WLAN RF signal strength. Input 290 includes a numeric keypad, a keyboard and/or other input device and enables a user to activate the WLAN detector 240.

In an alternative embodiment of the invention, a system comprising antenna 200, WLAN detector 240, ADC 245, display 280, processor 250 and memory 260, communicatively coupled together via a system bus, can form a standalone WLAN RF signal strength detection system or be integrated into any other device, such as a WLAN card.

FIG. 3 is a block diagram illustrating the memory 260 of the mobile phone 205 (FIGS. 2A and 2B). Memory 260 includes a WLAN detection engine 300, a voltage data structure 310, and an interface engine 320. WLAN detection engine 300 includes a comparator engine that compares the digitized DC voltage output from the WLAN detector 240 via the ADC 245 to at least one reference voltage in the voltage data structure 310. The voltage data structure 310 is a data structure, such as a table, that holds at least one reference voltage that corresponds to a WLAN RF signal strength level. Corresponding to each reference voltage in data structure 310 is an output field indicating text to output once a reference voltage is met. Alternatively, the output field may indicate other data besides text to output. Voltage data structure table 310 will be discussed in further detail in conjunction with FIG. 4 below.

Interface engine 320 displays, via display 280, data indicating the strength of the received WLAN RF signal. The data indicating signal strength is based on the result of the comparison by WLAN detection engine 300 and can be displayed in a multitude of formats including a number corresponding to signal strength, colors corresponding to signal strength, text indicating signal strength and/or a bar corresponding to signal strength, etc. In an alternative embodiment of the invention, the interface engine 320 can output a sound corresponding to the signal strength via a speaker (not shown). For example, signal strength could be represented by rate of repetition of the sound, the pitch of the sound, and/or the volume of the sound, etc.

FIG. 4 is a block diagram illustrating the voltage data structure 310 of the memory 260 (FIG. 3). In one embodiment of the data structure 310, the voltages stored include 0.7 volts corresponding to a weak signal strength of at least about −65 dBm; 0.9 volts corresponding to a medium signal strength of at least about −55 dBm; and 1.1 volts corresponding to a strong signal strength of at least about −45 dBm. These voltage levels are based on using an Analog Devices AD8313 as the WLAN detector 240. Different devices may require different reference voltage levels in voltage data structure 310. In an embodiment of the invention, voltage data structure 310 may include fewer or additional reference voltages to decrease or increase signal strength measurement accuracy respectively. The data structure 310 also includes an output field containing text for each reference voltage. This text can be output whenever the digitized voltage is greater than a reference voltage. Alternatively, other visual and/or aural output mechanisms can be used and represented in the output field.

FIG. 5 is a flowchart illustrating a method 500 of determining WLAN signal strength. Method 500 can be repeated continuously until stopped by a user. First, a WLAN RF signal, such as a Wi-Fi signal, is received (510) from an access point, such as access point 110. In an embodiment of the invention, antenna 200 receives (510) the WLAN RF signal. After receiving (510), the WLAN RF signal is converted (520) into a DC voltage. In an embodiment of the invention, WLAN detector 240 can perform the conversion (520). After conversion (520), the DC voltage is digitized (530) into a digital value.

After digitization (530), the digital value is compared (540) with reference voltages corresponding to signal strength. In an embodiment of the invention, the WLAN detection engine 300 can perform the comparison (540) by comparing (540) reference voltages in voltage data structure 310. Based on results of the comparison (540), data is output (550) corresponding to the signal strength. In an embodiment of the invention, the interface engine 320 outputs (550) the data, which can be visual and/or aural. For example, if the digitized data is at least 0.7 V, then interface engine 320 displays a single bar on display 280 indicating weak WLAN RF signal strength. If the digitized data is at least 0.9 V, then interface engine 320 display two bars on display 280 indicating medium WLAN RF signal strength. If the digitized data is at least 1.1 V, then interface engine 320 displays 3 bars on display 280 indicating strong WLAN RF signal strength. The method 500 then ends.

Figure 6:
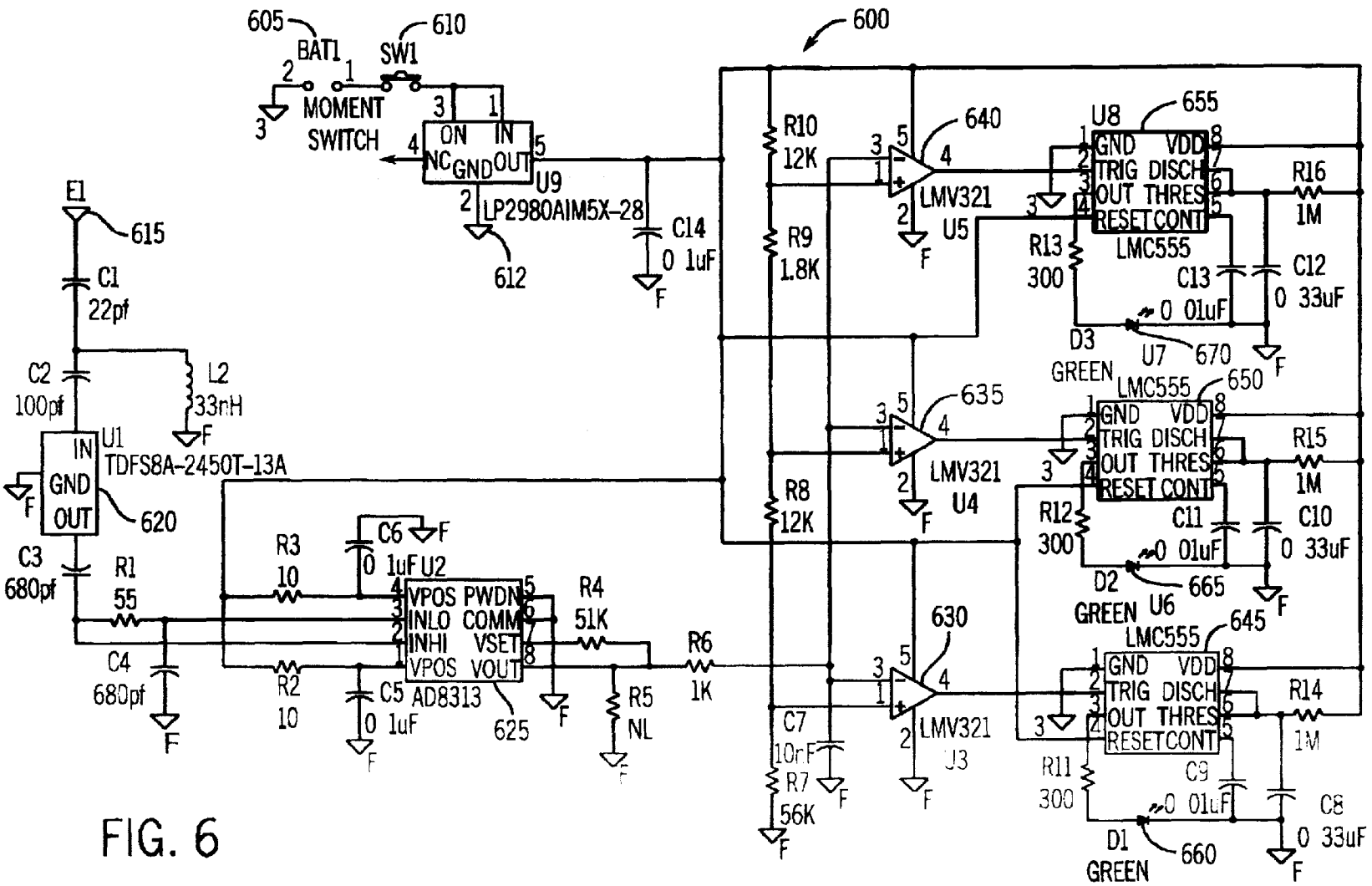
FIG. 6 is a circuit diagram illustrating a system to determine WLAN RF signal strength according to a second embodiment of the invention.

FIG. 6 is a circuit diagram illustrating a system 600 to determine WLAN RF signal strength according to a second embodiment of the invention. In an embodiment of the invention, system 600 is integrated into a WLAN card. In another embodiment of the invention, system 600 is a standalone device integrated onto 5.5 cm by 3 cm board that draws less than 20 mA from a 2.75V power source, such as a battery. In another embodiment, system 600 is integrated with a mobile phone. It will be appreciated by a person of ordinary skill in the art that system 600 can be integrated with any type device.

A battery 605 supplies 2.75V to system 600. Coupled to the battery is switch 610, which enables a user to turn on system 600 and supply power from battery 605 to the system 600. A regulator 612, such as a National Semiconductor LP2980AIMx-2.8 Micropower 50 mA Ultra Low-Dropout Regulator, regulates the power supply from battery 605. A WLAN chip antenna 615, such as a Mitsubishi Materials Corporation AHD1403-244ST01 surface mountable dielectric chip antenna, receives a WLAN RF signal from an access point, such as access point 110. Return loss on antenna 615 is generally about −12 dB in the 2.4–2.5 GHz band. A band-pass filter 620, such as a Toko TDFS8A-2450T miniature band-pass filter, is coupled to the antenna 615. In an embodiment of the invention, band-pass filter 620 has a 2 dB insertion loss in the 2.4–2.5 GHz band. Attenuation at 1.9 GHz is about 40 dB.

A WLAN detector 625, such as an Analog Devices AD8313, is coupled to the band pass filter 620. The detector 625 converts a modulated WLAN RF signal at its differential input 2 and 3 to an equivalent decibel-scaled voltage value at its DC voltage output 8. Three Operational Amplifiers (OPAMPs) 630, 635, and 640 are each coupled to the DC voltage output 8 of the WLAN detector 625 and receive the voltage at an invert pin. An example of a suitable OPAMP for use with an embodiment of the invention is a National Semiconductor LMV321.

Each OPAMP 630, 635, and 640 has a non-invert pin set to a reference voltage that is compared with the decibel-scaled value from DC voltage output 8. Specifically, OPAMP 630 has a non-invert pin set to 0.7V, OPAMP 635 has a non-invert pin set to 0.9V, and OPAMP 640 has a non-invert pin set to 1.1V. The OPAMPs 630, 635, and 640 act as comparators and compare the DC voltage output from the WLAN detector 625 with a reference voltage at their respective non-invert pins.

In particular, OPAMP 630 compares the DC voltage output with its non-invert pin set to 0.7V. If the DC voltage output is greater than 0.7V, which corresponds with a WLAN RF signal being greater than about −65 dBm, the OPAMP 630 outputs a true signal. If the DC voltage output is less than 0.7V, then the OPAMP 630 outputs a false signal.

OPAMP 635 compares the DC voltage output with its non-invert pin set to 0.9V. If the DC voltage output is greater than 0.9V, which corresponds with a WLAN RF signal being greater than about −55 dBm, the OPAMP 635 outputs a true signal. If the DC voltage output is less than 0.9V, then the OPAMP 635 outputs a false signal.

OPAMP 640 compares the DC voltage output with its non-invert pin set to 1.1V. If the DC voltage output is greater than 1.1V, which corresponds with a WLAN RF signal being greater than about −45 dBm, the OPAMP 640 outputs a true signal. If the DC voltage output is less than 1.1V, then the OPAMP 640 outputs a false signal.

CMOS timers 645, 650, and 655 are coupled respectively to OPAMPs 630, 635, and 640. Coupled to CMOS timers 645, 650, and 655 are green LEDs 660, 665, and 670 respectively. An example of suitable CMOS timer for use with an embodiment of the invention is a National Semiconductor LMC555 CMOS timer. If a CMOS timer receives a true signal from an OPAMP, the timer will output a 0.3 second high voltage pulse causing the LED coupled to the CMOS timer to illuminate.

For example, if the WLAN RF signal is about −65 dBm (i.e., WLAN detector 625 outputs a voltage of 0.7V), OPAMP 630 will send a true signal to CMOS timer 645, which in turn will send a 0.3 second high voltage pulse to LED 660, which will illuminate. If the WLAN RF signal is about −45 dBm (i.e., WLAN detector 625 outputs a voltage of 1.1V), then OPAMP 630 will send a true signal to CMOS timer 645, which in turn will send a 0.3 second high voltage pulse to LED 660, which will illuminate. In addition, OPAMP 635 will send a true signal to CMOS timer 650, which in turn will send a 0.3 second high voltage pulse to LED 665, which will illuminate. Further, OPAMP 640 will send a true signal to CMOS timer 655, which in turn will send a 0.3 second high voltage pulse to LED 670, which will also illuminate. Accordingly, if the WLAN RF signal is weak, then only LED 660 will illuminate. If the WLAN RF is of medium strength, then LED 660 and LED 665 will illuminate. If the WLAN RF signal is strong, then LED 660, 665, and 670 will all illuminate. If there is no WLAN RF signal, or the WLAN RF signal is extremely weak, then no LEDs will illuminate.

It will be appreciated by one of ordinary skill in the art that the aural devices in place of or in addition to LEDs 660, 665, and 670 may be used. Further, it will be appreciated that fewer or additional OPAMPs, CMOS timers, and LEDs may be used.

FIG. 7 is a table showing experimental data using the second embodiment of the invention. To test system 600, the system 600 was hooked up to a 3.0V power supply. To generate the WLAN RF signals, an Anristu Signal Generator coupled to a quarter-wavelength antenna was used. As power increased from −65 dBm to −20 dBm, the number of LEDs illuminated increased from 1 LED to 3 LEDs at 2400 GHz and 2450 GHz. At 2500 GHz and −65 dBm, no LEDs were illuminated.

When system 600 was tested at locations featuring WLAN service, the system 600 generally had 3 LEDs illuminated inside the location. At the entranceway (outside of the location), 2 LEDs were generally illuminated. At 3–5 meters outside of the location, only 1 LED was generally illuminated. At about 10 meters outside of the location, no LEDs were illuminated.

The foregoing description of the illustrated embodiments of the present invention is by way of example only, and other variations and modifications of the above-described embodiments and methods are possible in light of the foregoing teaching. For example, an aural output device can be used in place of a visual display device. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:

receiving a WLAN RF signal;

converting the WLAN RF signal to a voltage proportional to the signal;

comparing the voltage to a first reference voltage;

outputting data corresponding to WLAN RF signal strength if the voltage is greater than the first reference voltage;

comparing the voltage to a second reference voltage; and outputting additional data corresponding to WLAN RF signal strength if the voltage is greater than the second reference voltage.

2. The method of claim 1, wherein the outputting includes outputting visual data.

3. The method of claim 1, wherein the outputting includes causing at least one LED to illuminate.

4. The method of claim 1, wherein the outputting includes emitting a sound corresponding to WLAN RF signal strength.

5. The method of claim 1, further comprising comparing the voltage to a third reference voltage; and outputting further data corresponding to WLAN RF signal strength if the voltage is greater than the third reference voltage.

6. The method of claim 1, wherein the WLAN RF signal includes a Wi-Fi signal.

7. A WLAN RF signal strength determination system, comprising:

means for receiving a WLAN RF signal;

means for converting the WLAN RF signal to a voltage proportional to the signal;

means for comparing the voltage to a first reference voltage;

means for outputting data corresponding to WLAN RF signal strength if the voltage is greater than the reference voltage;

means for comparing the voltage to a second reference voltage; and means for outputting additional data corresponding to WLAN RF signal strength if the voltage is greater than the second reference voltage.

8. A computer-readable medium having stored thereon instructions to cause a computer to execute a method, the method comprising:

converting a received WLAN RF signal to a voltage proportional to the signal;

digitizing the converted voltage;

comparing the digitized voltage to a first reference voltage;

outputting data corresponding to WLAN RF signal strength if the digitized voltage is greater than the first reference voltage;

comparing the digitized voltage to a second reference voltage; and outputting additional data corresponding to WLAN RF signal strength if the voltage is greater than the second reference voltage.

9. The computer-readable medium of claim 8, wherein the outputting includes outputting visual data.

10. The computer-readable medium of claim 8, wherein the outputting includes causing at least one LED to illuminate.

11. The computer-readable medium of claim 8, wherein the outputting includes emitting a sound corresponding to WLAN RF signal strength.

12. The computer-readable medium of claim 8, the method further comprising comparing the voltage to a third reference voltage; and outputting further data corresponding to WLAN RF signal strength if the voltage is greater than the third reference voltage.

13. The computer-readable medium of claim 8, wherein the WLAN RF signal includes a Wi-Fi signal.

14. A WLAN RF signal strength determination system, comprising:

an antenna capable to receive WLAN RF signals;

a WLAN detector, coupled to the antenna, capable to convert a received WLAN RF signal into a DC voltage proportional to the strength of the WLAN RF signal;

an operational amplifier, coupled to the WLAN detector, capable to emit a signal if the DC voltage is greater than a first reference voltage;

a timer, coupled to the operational amplifier, capable to emit a high voltage pulse upon receipt of a signal from the operational amplifier;

a LED, coupled to the timer, capable to emit a light upon receipt of the high voltage pulse from the timer;

a second operational amplifier coupled to the WLAN detector, capable to emit a signal if the DC voltage is greater than a second reference voltage that is higher than the first reference voltage;

a second timer, coupled to the second operational amplifier, capable to emit a high voltage pulse upon receipt of a signal from the second operational amplifier; and a second LED, coupled to the second timer, capable to emit a light upon receipt of the high voltage pulse from the second timer.

15. The system of claim 14, wherein the WLAN RF signal includes a Wi-Fi signal.

16. The system of claim 14, further comprising:

a third operational amplifier coupled to the WLAN detector, capable to emit a signal if the DC voltage is greater than a third reference voltage that is higher than the second reference voltage;

a third timer, coupled to the third operational amplifier, capable to emit a high voltage pulse upon receipt of a signal from the third operational amplifier; and a third LED, coupled to the third timer, capable to emit a light upon receipt of the high voltage pulse from the third timer.

*17. A wireless local area network (WLAN) radio frequency (RF) signal strength determination system, the system comprising:*

*an antenna configured to receive a WLAN RF signal;*

*a power detector coupled to the antenna and configured to convert the WLAN RF signal into a direct current (DC) voltage, wherein the DC voltage is proportional to a strength of the WLAN RF signal;*

*a comparator coupled to the power detector and configured to emit a first signal if the DC voltage is greater than a first reference voltage and a second signal if the DC voltage is greater than a second reference voltage; and*

*an output interface coupled to the comparator and configured to indicate the strength of the WLAN RF signal.*

*18. The system of claim 17, wherein at least one of the power detector, the comparator, or the output interface is integrated into a WLAN card.*

*19. The system of claim 17, wherein at least one of the power detector, the comparator, or the output interface is integrated into a mobile phone.*

*20. The system of claim 17, wherein the output interface indicates the strength of the WLAN RF signal through one or more bars.*

*21. The system of claim 17, wherein the output interface indicates the strength of the WLAN RF signal through one or more light emitting diodes, one or more colors, text, or one or more sounds.*

*22. The system of claim 17, further comprising an analog-to-digital converter configured to convert the DC voltage into a digital value, and further wherein the comparator emits the first signal if the digital value is greater than the first reference voltage and the second signal if the digital value is greater than the second reference voltage.*

*23. A mobile phone comprising:*

*a receiver configured to receive a wireless local area network (WLAN) radio frequency (RF) signal;*

*a converter coupled to the receiver and configured to convert the WLAN RF signal into a direct current (DC) voltage;*

*a processor coupled to the converter and configured to compare the DC voltage to a first reference voltage and a second reference voltage; and*

*a display coupled to the processor and configured to output a result of the comparison of the DC voltage to the first reference voltage and the second reference voltage, wherein the result comprises a strength of the WLAN RF signal.*

*24. The mobile phone of claim 23, further comprising an analog-to-digital converter configured to convert the DC voltage into a digital value.*

*25. The mobile phone of claim 24, wherein the processor compares the digital value to the first reference voltage and the second reference voltage.*

*26. A computer-readable medium having computer-readable instructions stored thereon, wherein, upon execution by a processor, the computer-readable instructions are configured to cause the processor to:*

*convert a received wireless local area network (WLAN) radio frequency (RF) signal into a direct current (DC) voltage, wherein the DC voltage is proportional to the WLAN RF signal;*

*compare the DC voltage to a first reference voltage and a second reference voltage;*

*generate a first signal if the DC voltage is greater than the first reference voltage, wherein the first signal represents a first strength of the WLAN RF signal; and*

*generate a second signal if the DC voltage is greater than the second reference voltage, wherein the second signal represents a second strength of the WLAN RF signal.*

*27. The computer-readable medium of claim 26, wherein the processor is further caused to output the first signal to a display.*

*28. The computer-readable medium of claim 27, wherein the display indicates the first strength of the WLAN RF signal through one or more bars, one or more light emitting diodes, one or more colors, text, or one or more sounds.*

*29. The computer-readable medium of claim 26, wherein the processor is further caused to:*

*convert the DC voltage into a digital value;*

*generate the first signal if the digital value is greater than the first reference voltage; and*

*generate the second signal if the digital value is greater than the second reference voltage.*

* * * * *